(12) United States Patent
Ogura et al.

(10) Patent No.: US 8,243,301 B2
(45) Date of Patent: *Aug. 14, 2012

(54) IMAGE FORMING APPARATUS

(75) Inventors: Kazuhiro Ogura, Fujisawa (JP); Shinji Makishima, Tokyo (JP); Akihiro Mizutani, Tokyo (JP); Toshihiro Ida, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 12/776,916

(22) Filed: May 10, 2010

(65) Prior Publication Data

US 2010/0220349 A1    Sep. 2, 2010

Related U.S. Application Data

(63) Continuation of application No. 11/344,127, filed on Feb. 1, 2006, now Pat. No. 7,738,124.

(51) Int. Cl.
*G06K 15/00* (2006.01)
*G06F 3/12* (2006.01)

(52) U.S. Cl. ............ 358/1.14; 358/1.15; 358/1.13

(58) Field of Classification Search .............. None
See application file for complete search history.

(56) References Cited

U.S. PATENT DOCUMENTS

| 5,287,194 | A | 2/1994 | Lobiondo | |
| 5,970,218 | A | 10/1999 | Mullin et al. | |
| 6,771,386 | B1 | 8/2004 | Kato | |
| 7,738,124 | B2 * | 6/2010 | Ogura et al. | 358/1.14 |
| 7,791,747 | B2 * | 9/2010 | Roksz | 358/1.14 |
| 2003/0098989 | A1 * | 5/2003 | Roos | 358/1.14 |
| 2006/0227371 | A1 * | 10/2006 | Roksz | 358/1.15 |
| 2008/0192289 | A1 * | 8/2008 | Honda et al. | 358/1.15 |

FOREIGN PATENT DOCUMENTS

| JP | 09-292802 A | 11/1997 |
| JP | 10-16355 A | 1/1998 |
| JP | 2000-177212 A | 6/2000 |
| JP | 2000-276314 A | 10/2000 |
| JP | 2004-098413 A | 4/2004 |
| JP | 2004-341809 A | 12/2004 |
| JP | 2005-342939 A | 12/2005 |
| JP | 2006-010969 A | 1/2006 |

OTHER PUBLICATIONS

U.S. Appl. No. 11/302,146, filed Dec. 14, 2005, Mizutani et al.
K. Ogura, U.S. PTO Notice of Allowance, U.S. Appl. No. 11/344,127, dated Feb. 1, 2010.
K. Ogura, U.S. PTO Office Action, U.S. Appl. No. 11/344,127, dated Aug. 6, 2009.

* cited by examiner

*Primary Examiner* — Dov Popovici
(74) *Attorney, Agent, or Firm* — Foley & Lardner LLP

(57) ABSTRACT

An image forming apparatus performs a user authentication process and performs a private print process according to a request from an authenticated user. When the user requests interruption of the private print which is now performed or it is detected that the user has left a place near the image forming apparatus while the private print is being performed, the image forming apparatus interrupts the private print which is now performed and stores a print state at the interruption time. Further, the image forming apparatus performs a user authentication process and re-starts the private print which is interrupted in response to a re-start request from the authenticated user.

20 Claims, 10 Drawing Sheets

| Job ID | Reception date and time | User ID | Security print | Now interrupted | Print data | Print state |
|---|---|---|---|---|---|---|
| J00013 | 2005/02/21 12:24 | Taro | Yes | Yes | xxx.ps | |
| J00014 | 2005/02/21 | Hanako | | | Yyy.ps | |
| J00015 | 2005/02/21 | | | | | |

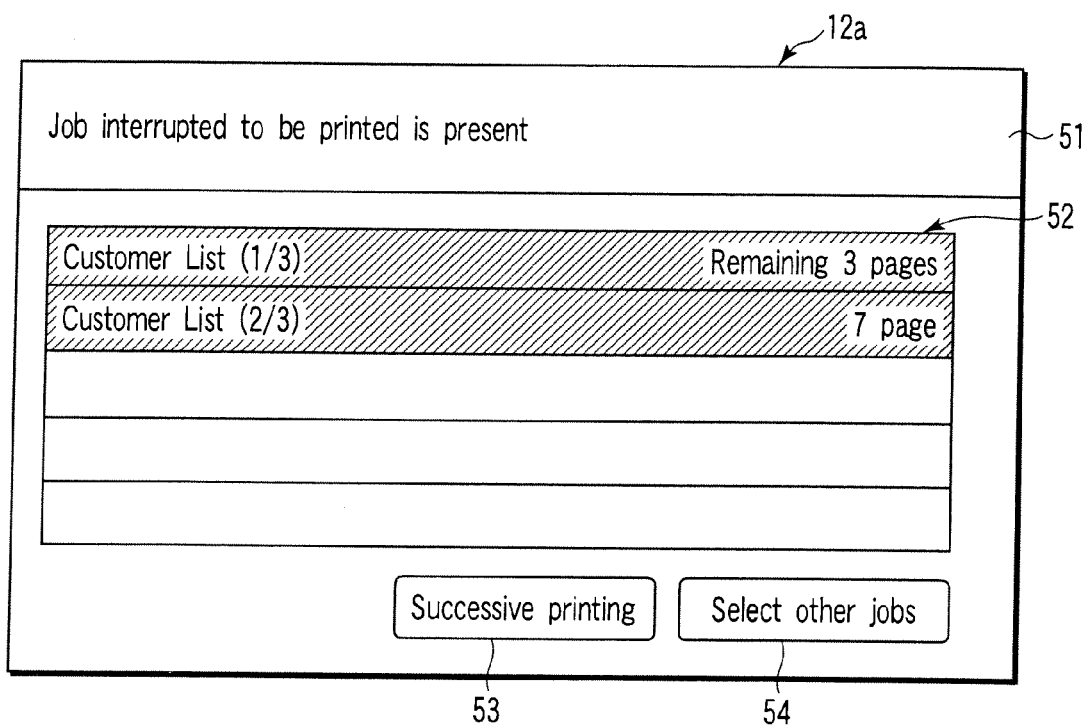
F I G. 10

IMAGE FORMING APPARATUS

CROSS-REFERENCE TO RELATED APPLICATIONS

This application is a Continuation application of U.S. application Ser. No. 11/344,127, filed Feb. 1, 2006, the entire contents of which are incorporated herein by reference.

BACKGROUND OF THE INVENTION

1. Field of the Invention

This invention relates to an image forming apparatus having a network print function to perform a print process in response to a print request from a terminal device connected thereto via a network, for example.

2. Description of the Related Art

Some of the conventional image forming apparatuses each have a network print function to perform a print process in response to a print request from an equipment connected to a network. In the above image forming apparatus, print requests from the equipments on the network print are spooled as jobs (print jobs) in a job database. Further, the network print process includes normal and private print processes.

The normal print process is performed by causing a printer which has received a request of the normal print process to sequentially perform print processes. Therefore, there occurs a possibility that the user forgets to take away the print result or erroneously takes away the print result of the other user.

On the other hand, the private print process is performed by causing the user who has requested the private print process by use of the terminal equipment to go to the installation place of the printer and directly instruct the printer to start the private print process. Therefore, in the private print process, the degree of security of the print result can be enhanced by the presence of the user near the printer while the private print process is being performed.

The technique similar to that of the private print is disclosed in Jpn. Pat. Appln. KOKAI Publication No. H9-292802. In Jpn. Pat. Appln. KOKAI Publication No. H9-292802, the copy operation (the copying process in a password mode) by the operation of the user (the user of the password mode) recognized by use of the password is described. In Jpn. Pat. Appln. KOKAI Publication No. H9-292802, the technique of inhibiting a user other than the user of the password mode from performing the copying operation in the password mode and re-starting the copying operation in response to re-input of a password code by the user of the password mode when the copying operation is interrupted is described.

BRIEF SUMMARY OF THE INVENTION

An image forming apparatus according to one aspect of this invention comprises a user authenticating portion which authenticates users, an interface which receives a print request from an external equipment, a job database which spools a private print request received by the interface as a private print job, a printer which executes the private print job spooled in the job database in response to an execution request from the user authenticated by the user authenticating portion, a detecting portion which detects interruption of a private print process performed by the printer, and a controller which interrupts execution of the private print job by the printer when interruption of the private print process which is being performed is detected by the detecting portion.

An image forming apparatus according to another aspect of this invention comprises a user authenticating portion which authenticates users, an interface which receives a print request from an external equipment, a controller which divides a private print into a plurality of private print jobs each of which has a print amount less than a preset permissible amount when a print amount of the private print received by the interface exceeds a preset permissible amount, a job database which spools a plurality of private print jobs divided by the controller, and a printer which executes the private print jobs spooled in the job database in response to an execution request from a user authenticated by the user authenticating portion.

An image forming apparatus according to still another aspect of this invention comprises a user authenticating portion which authenticates users, an interface which receives a print request from an external equipment, a job database which spools a private print request received by the interface as a private print job, an operating portion which receives a request of changing a processing method for a private print job by a user authenticated by the user authenticating portion when a print amount of the private print job which is requested to be executed by the user exceeds a preset permissible amount, a controller which performs a process for the private print job according to a processing method input by the operating portion, and a printer which executes the private print job processed by the controller in response to a request from the controller.

An image forming method according to another aspect of this invention which is used in an image forming apparatus having an interface which receives a print request from an external equipment, comprises spooling a private print request received by the interface in a job database as a private print job, authenticating users, executing the private print job spooled in the job database in response to an execution request from the authenticated user, detecting interruption of a private print job which is being executed, and interrupting the private print job which is being executed when the interruption of the private print job which is being executed is detected.

An image forming method according to still another aspect of this invention which is used in an image forming apparatus having an interface which receives a print request from an external equipment, comprises determining whether a print amount of a private print exceeds a preset permissible amount when a private print request received by the interface is received, dividing the private print into a plurality of private print jobs each having a print amount less than the permissible amount when it is determined in the determining step that the print amount of the received private print exceeds the preset permissible amount, spooling a plurality of divided private print jobs in a job database, authenticating users, and executing the private print jobs spooled in the job database in response to an execution request from the authenticated user.

An image forming method according to another aspect of this invention which is used in an image forming apparatus having an interface which receives a print request from an external equipment, comprises spooling a private print request received by the interface in a job database as a private print job, authenticating users, determining whether a print amount of a private print job which is requested to be executed by the authenticated user exceeds a preset permissible amount, receiving a request of changing a processing method for a private print job by an authenticated user when it is determined in the above determining step that a print amount of the private print job which is requested to be executed by the authenticated user exceeds a preset permissible amount, processing the private print job according to a processing method for the private print job which is requested to be changed and selected by the user, and executing the private print job processed according to the processing method selected by the user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a view showing a display example of a selection screen of the private print job which is now interrupted;

DETAILED DESCRIPTION OF THE INVENTION

There will now be described embodiments of this invention with reference to the accompanying drawings.

First, a network print system according to an embodiment of this invention is explained.

Figure 1:
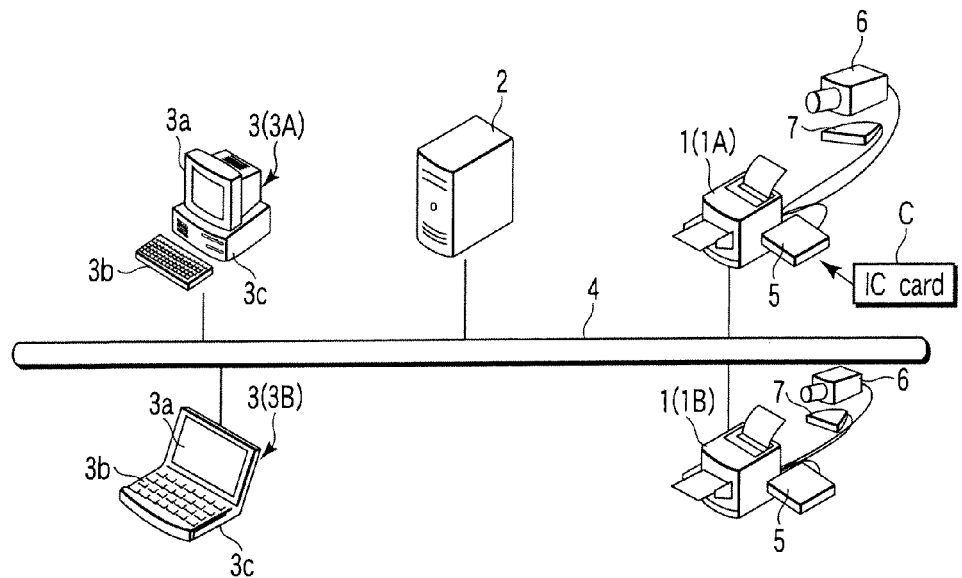
FIG. 1 is a view schematically showing the whole configuration of a network print system.

FIG. 1 is a view schematically showing the whole configuration of the network print system.

As shown in FIG. 1, the network print system includes image forming apparatuses 1 (1A, 1B), server device 2 and terminal devices 3 (3A, 3B) which are connected to one another via a network 4.

For example, the image forming apparatus 1 is realized by a digital compound machine (MFP), network printer or the like. The image forming apparatus 1 has a function (network print function) of performing a print process in response to a print request from the terminal device 3 or the like via the network. The network print function is realized by causing the image forming apparatus 1 to spool a print request from each terminal device 3 or the like in a job database 20 which will be described later as a print job.

Further, the image forming apparatus 1 is connected to a reader/writer device 5, camera 6, sensor 7 and the like. The reader/writer device 5 has a function of reading information stored in a storage medium and a function of writing information into the storage medium. As the storage medium from or into which data is read out or written by the reader/writer device 5, any type of storage medium can be used if it can be carried by the user.

For example, as the storage medium, an IC card, memory card, portable storage device or portable terminal device can be applied. In this embodiment, it is assumed that an IC card possessed by each user is used as the storage medium. In this case, user information containing authentication data of each user is stored in each IC card. Further, the IC card may be a non-contact type IC card (an IC card which performs data communication by radio) or contact type IC card (an IC card which performs data communication via a contact portion).

The camera 6 photographs an image of a portion near the image forming apparatus 1. An image photographed by the camera 6 is used to monitor a person who has operated the image forming apparatus 1 or a person has taken away a sheet or sheets of paper (print result) which the image forming apparatus 1 has printed. Further, an image photographed by the camera 6 may be used to determine whether or not a specified person (authenticated user) is present near the image forming apparatus 1.

The sensor 7 senses a person existing near the image forming apparatus 1. The sensor 7 is configured by a sensor which senses a person. The sensing result of the sensor 7 is used to determine whether or not a person is present near the image forming apparatus 1. For example, when the sensing result of the sensor 7 which has sensed a specified person (authenticated user) is transferred into a state in which it cannot sense the person, it is determined that the person has left a place near the image forming apparatus 1.

The server device 2 functions as a data server, for example. In the network print system of this embodiment, the server device 2 can be omitted.

The terminal device 3 (3A, 3B) is a device used by the user. For example, the terminal device 3 is configured by a personal computer (PC) or the like. The terminal device 3 includes a display portion 3a, operating portion 3b and processing portion 3c.

The display portion 3a is configured by a display device. The operating portion 3b is configured by an operating device such as a keyboard or mouse. The processing portion 3c includes a CPU as a control portion, various memories as a storage portion, a display control portion which controls the display portion 3a, an interface for the operating portion 3b, a communication interface for network communication and the like. The processing portion 3c has a function of causing the CPU or the like to perform various processes by executing an application program stored in the storage portion.

Next, a configuration example of the image forming apparatus 1 is explained.

Figure 2:
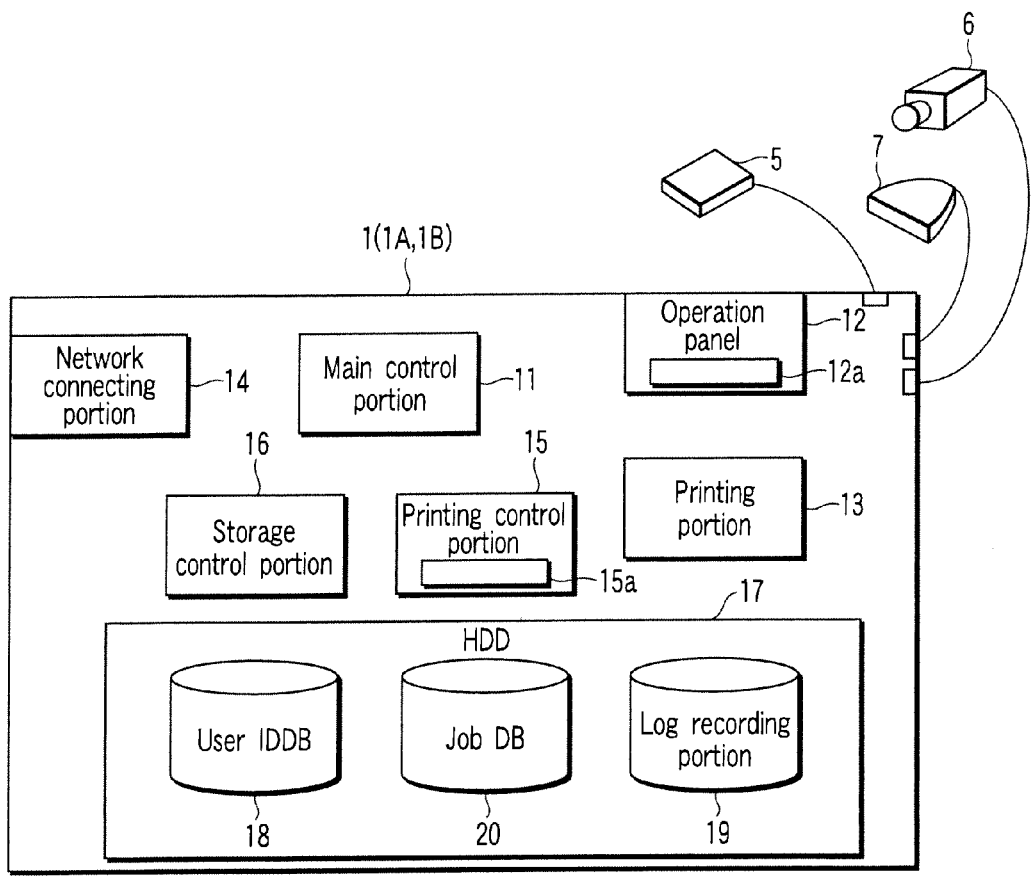
FIG. 2 is a block diagram schematically showing an example of the configuration of an image forming apparatus.

FIG. 2 is a block diagram schematically showing the configuration example of the image forming apparatus 1.

As shown in FIG. 2, the image forming apparatus 1 includes a main control portion 11, operation panel 12, printing portion 13, network connecting portion 14, printing control portion 15, storage control portion 16, hard disk drive (HDD) 17 and the like.

The main control portion 11 controls the whole portion of the image forming apparatus. The main control portion 11 has a function of controlling respective portions. Further, the main control portion 11 includes a CPU (Central Processing Unit), RAM (Random Access Memory), ROM (Read Only Memory), nonvolatile memory, image processing portion and the like. In the main control portion 11, the CPU executes a control program stored in the ROM, nonvolatile memory or HDD 17 to realize various functions or various processes.

The operation panel 12 is a user interface to which an operation instruction from the user is input. The operation panel 12 has a hard key portion such as a ten-key pad and a display portion 12a configured by a display device containing a touch panel. On the display portion 12a of the operation panel 12, an operation guide or touch keys are displayed. In the operation panel 12, input to the touch key by use of the touch panel displayed on the display portion 12a is sensed.

The printing portion 13 forms an image on an image-forming medium. The printing portion 13 is configured by a feeding portion (not shown) which feeds an image-forming medium and an image forming portion (not shown) which forms a color image or monochrome image on the image-forming medium fed by the feeding portion. Further, in the printing portion 13, the printing process of printing image data on the image-forming medium is performed under control of the printing control portion 15. The printing control portion 15 controls the print mode of the print process by the printing portion 13 in response to a request from the main control portion 11. The printing control portion 15 has a setting storage portion 15a which stores setting information.

The network connecting portion 14 controls data communication via the network 4. The network connecting portion 14 is configured by a network interface card (NIC) which makes a connection with the network 4, for example. In the configuration example shown in FIG. 1, the network connecting portion 14 realizes data communication with the server device 2 or terminal device (PC) 3 via the network 4.

The storage control portion 16 controls input/output of data with respect to the HDD 17. Data is read out from or written into the HDD 17 under control of the storage control portion 16. The HDD 17 is also used as a backup memory for various data items and various setting data items or management data items are stored therein. Further, in the HDD 17, data received via the network 4 is stored as required.

In addition, in the HDD 17, a user information database (DB) 18, log recording portion 19 and job database (JobDB) 20 are provided.

The user information database 18 is a database which stores user information. In the user information database 18, user IDs and authentication data items are stored in one-to-one correspondence for the respective users. The user ID is identification information of each user. The authentication data is data used to perform the authenticating process for the user specified by the user ID. For example, in the authentication data, a password or the like is used. As the authentication data, any information can be used if the user can be authenticated and, for example, living body information can be used.

Further, the user information database 18 can be provided in another equipment such as the server device 2 on the network 4. That is, the user information database 18 may be installed so as to acquire desired data when the image forming apparatus 1 performs the user authenticating process or the like in the network system.

The log recording portion 19 is a database which stores process history information. For example, in the log recording portion 19, information indicating print date and time, printing person, paper discharging state, operating state, print image is recorded. Further, as the print history, an image photographed by the camera 6 at the printing time may be recorded in the log recording portion 19. In this case, the log recording portion 19 may be installed on an equipment such as the server device 2 on the network 4 which the image forming apparatus 1 can access.

The job database (spooler) 20 spools print jobs. For example, when the image forming apparatus 1 receives a print request from the terminal device 3 via the network 4, the print request received is spooled as a print job in the job database 20.

The job database 20 may be installed on an equipment such as the server 2 on the network 4 which the image forming apparatus can access. Further, the job database may be commonly used by a plurality of image forming apparatuses connected to the network 4. However, in the following explanation, it is supposed that each of the image forming apparatuses has the job database 20.

The reader/writer device 5, camera 6 and sensor 7 are connected to the image forming apparatuses 1 via the interfaces 5a, 6a, 7a.

As described before, the reader/writer device 5 has a function of reading out information stored in an IC card used as a storage medium which the user provides and a function of writing information into the IC card. For example, information read out from the IC card used as the storage medium by the reader/writer device 5 is supplied to the main control portion 11 via the interface 5a.

For example, in the main control portion 11, user authentication is performed based on user information (authentication data) read out from the IC card presented by the user by use of the reader/writer device 5.

As described before, the camera 6 photographs an image of a portion near the image forming apparatus 1. An image photographed by the camera 6 is supplied to the main control portion 11 via the interface 6a.

For example, in the main control portion 11, an image photographed by the camera 6 is stored in the log recording portion 19 of the HDD 17. Further, in the main control portion 11, a person can be sensed based on the image photographed by the camera 6. For example, in the main control portion 11, whether a person exists near the image forming apparatus 1 or not can be determined by extracting a face of the person from the image photographed by the camera 6.

As described before, the sensor 7 is a sensor for sensing a person. The sensor 7 senses a person existing near the image forming apparatus 1. The sensing result by the sensor 7 is supplied to the main control portion 11 via the interface 7a.

In the main control portion 11, whether a person exists near the image forming apparatus 1 or not is determined based on the sensing result by the sensor 7. For example, in the main control portion 11, it is determined that a person has left a place near the image forming apparatus 1 when the sensing result of the sensor 7 was changed from a state in which the person was sensed to a state in which the person was not sensed.

The reader/writer device 5, camera 6 and sensor 7 are connected to the image forming apparatus 1 according to the application condition of the network print system. For example, if user authentication by using the IC card is not performed, the reader/writer device 5 can be omitted. If a person is not monitored or sensed based on an image of a portion near the image forming apparatus 1, the camera 6 can be omitted. Further, if a person existing near the image forming apparatus 1 is not sensed by the sensor, the sensor 7 can be omitted.

Next, an example of the configuration of the job database 20 is explained.

Figures 3, 4:
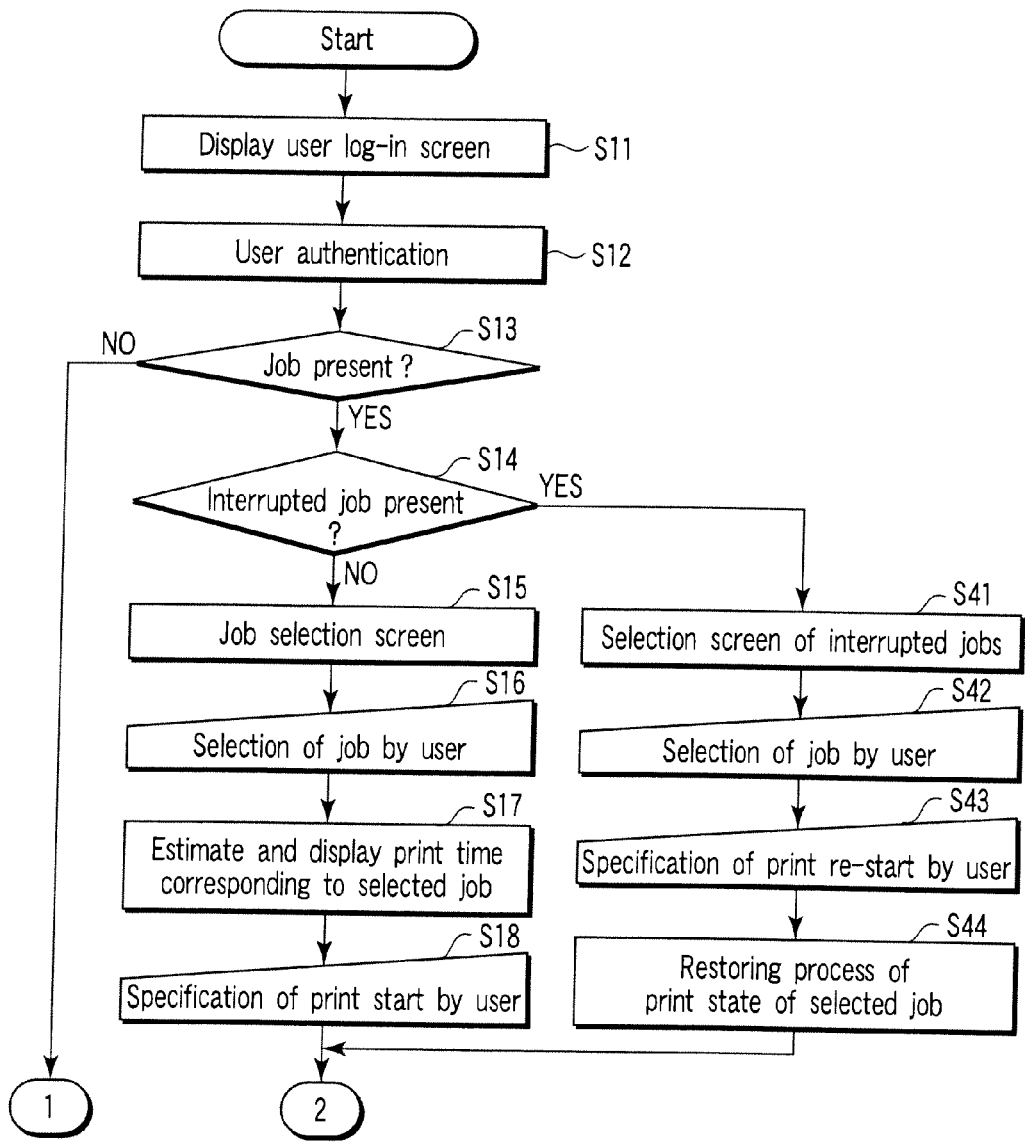
FIG. 3 is a diagram showing an example of the configuration of a job database.
FIG. 4 is a flowchart for illustrating a first process example of a private print in the image forming apparatus.

FIG. 3 is a diagram showing an example of the configuration of the job database 20.

In the example shown in FIG. 3, job ID, reception date and time, user ID, private print information, interruption information (during interruption), print data, print status information and the like are stored in the job database 20.

The job ID is identification information used to identify a print job. The reception date and time is information indicating the date and time at which the print job is received. The user ID is identification information used to identify a user. The private print information is information indicating that the print job is a private print which will be described later or not.

The interruption information is information indicating that the print job is set in an interrupted state or not. The print data is information indicating print data (data of a document) to be printed. For example, as the print data, a file name of print data (document) to be printed is stored.

The print status information is information indicating the state of progress of the print job. Further, when the print job is now interrupted, the execution state (print state) of the print job or the like at the time of interruption is stored as the print status information. For example, as the print status information of the interrupted print job, the number of pages printed up to the time of interruption or setting information or the like at the print time is stored. In other words, the print status information is information used to re-start execution of the print job which is now interrupted from the time of interruption. Therefore, the print job which is now interrupted is recovered into a print state which was set at the time of interruption based on the print status information.

Next, the network print in the image forming apparatus 1 with the above configuration is schematically explained.

The network print indicates that the image forming apparatus 1 executes a print job requested by the terminal device 3 or the like via the network 4. Further, as the network print, a function called a private print (which is also referred to as a security print) is provided. For example, the private print is executed by causing the user who has requested a printing process by use of the terminal device 3 to directly operate the image forming apparatus 1. Execution of the private print is based on the assumption that the user exists near the image forming apparatus 1 while the image forming apparatus 1 performs a printing operation.

In the above network system, the image forming apparatus 1 is commonly used by a plurality of users. Therefore, if the print operations are sequentially performed in response to various print requests from various equipments on the network 4 as the normal network print, sheets of paper printed in response to the respective print requests are sequentially discharged in the image forming apparatus 1. In other words, in the normal network print, the image forming apparatus 1 is set into a state in which sheets of paper as the processing result in response to the print requests from an unspecified large number of users are discharged. In such a state, an unspecified user can easily see the print result by the print request of the other user.

In contrast with the normal network print, the private print is to perform a print process in response to a print request from a user while the security is securely held. That is, in the private print, first, a print request from the user is held as a private print job in the job database 20 of the image forming apparatus 1. In the image forming apparatus 1, the private print job of the user is executed in response to input of an execution instruction of the private print to the operation panel 12 by the user.

The above private print is based on the assumption that the print requested by the user is performed in a state in which the user exists near the image forming apparatus 1. Therefore, in the private print, the print job is executed in a state in which the user exists near the image forming apparatus 1. As a result, in the private print, the security of the print result can be enhanced.

Next, the private print in the image forming apparatus 1 is schematically explained.

The private print is performed by performing a registration process of registering a print job (private print job) executed as a private print in the job database 20 and a print process of executing the private print job registered by the registration process according to an instruction from the user authenticated by the image forming apparatus.

In this case, it is assumed that the user has requested a private print for a document which is highly secret with respect to the image forming apparatus 1 by use of the terminal device 3.

In this case, the user first starts the printer driver to perform the private print in the image forming apparatus 1 by use of the terminal device 3. When the printer driver is started, the user selects print data (document) to be private-printed in the image forming apparatus 1 by operating the operating portion 3b of the terminal device 3 and issues an instruction to perform the private print by the image forming apparatus 1.

For example, in the printer driver operated by the processing portion 3c of the terminal device 3, a check box to issue an instruction for a private print is provided in the dialogue displayed on the display portion 3a of the terminal device 3. In this case, the user instructs a print of print data (document) by the image forming apparatus 1 in a state in which the check box of the private print is set ON by operating the operating portion 3c of the terminal device 3. Further, the private print can be requested to the image forming apparatus 1 by use of a printer driver exclusively used for the private print.

When receiving a request of the private print from the terminal device 3, the image forming apparatus 1 performs a process (registration process) of spooling the private print as a private print job in the job database 20. For example, as shown in FIG. 3, in the job database 20 of the image forming apparatus 1, job ID, reception date and time, user ID, private print information, interruption information, print data, printing state and the like are stored as information of the private print job. While the private print job is stored in the job database 20, the image forming apparatus 1 can perform an RIP process or the like for the print data.

Further, print data transmitted as a request of the private print from the terminal device 3 to the image forming apparatus 1 can be encoded or enciphered. In addition, the print data can be held in the coded or ciphered state in the job database 20 of the image forming apparatus 1. In this case, as a cryptosystem, for example, a public-key cryptosystem can be used.

The user who has requested the private print to the image forming apparatus 1 in the terminal device 3 moves from a position in front of the terminal device 3 to a position near the image forming apparatus 1. Then, the user who has moved to the position near the image forming apparatus 1 inputs user information (authentication data) in the image forming apparatus 1.

It is possible for the image forming apparatus 1 to read out user information from an IC card C presented by the user or acquire user information which the user inputs to the operation panel 12.

When acquiring the user information, the image forming apparatus 1 performs user authentication based on the acquired user information. If the user authentication based on the acquired user information is successfully performed, the image forming apparatus 1 executes the private print job of the user according to the operation of the operation panel 12 by the user.

The image forming apparatus 1 determines whether the private print which is now executed is to be interrupted or not while the private print is being executed. Whether the private print which is now executed is to be interrupted or not is determined based on the detection result of an interruption detecting process which will be described later. For example, when the user leaves a place near the image forming apparatus 1, the image forming apparatus 1 performs a process of interrupting the private print job which is now executed.

That is, when interruption of the private print which is now executed is detected in the interruption detecting process, the image forming apparatus 1 interrupts the private print process which is now performed and holds the print state up to the interruption time into the job database 20 as print status information. In this case, the user can take the sheets of paper (print result) printed up to the interruption time in hand and leave the place in front of the image forming apparatus 1.

Further, the interrupted private print is re-started in response to an operation by the user (the user authenticated by the user authentication) in the image forming apparatus 1. In this case, the print state at the interruption time is restored based on the print status information of the private print job held in the job database 20.

Next, a first process example of the private print in the image forming apparatus 1 is explained.

Figure 5:
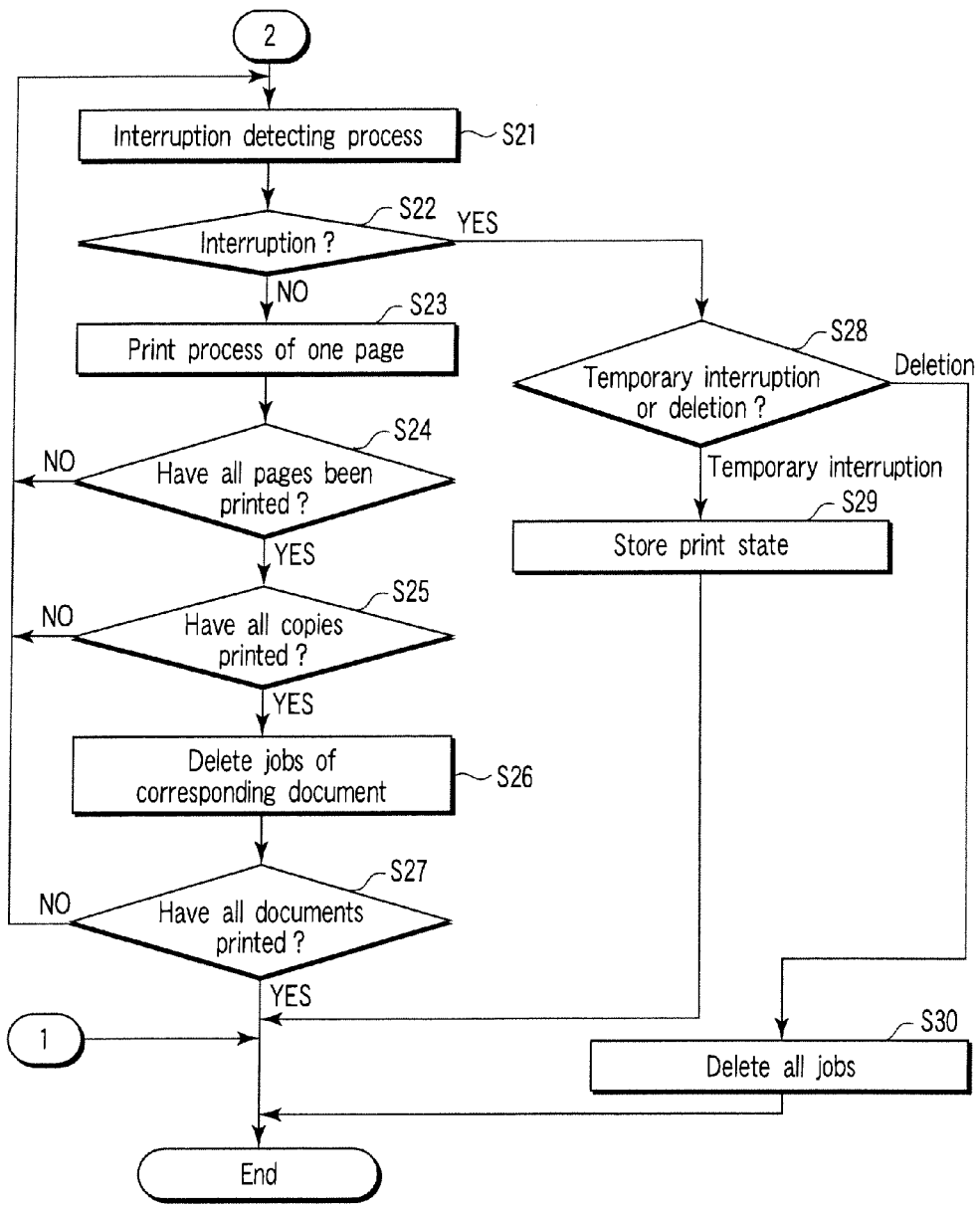
FIG. 5 is a flowchart for illustrating the first process example of the private print in the image forming apparatus.

FIGS. 4 and 5 are flowcharts for illustrating the first process example of the private print in the image forming apparatus 1.

The private print job registered in the job database 20 of the image forming apparatus 1 is executed as the private print process in the image forming apparatus 1.

That is, the user who has performed a registration process of the private print job of the private print by the above registration process moves to a place near the image forming apparatus 1. The user who has moved to the place near the image forming apparatus 1 selects a private print function by use of the operation panel 12 of the image forming apparatus 1. Then, the main control portion 11 of the image forming apparatus 1 displays a user authentication screen (log-in screen) on the display portion 12a of the operation panel 12 (step S11). The log-in screen is a display screen used to acquire information (authentication data) required for user authentication from the user himself.

Figure 6:
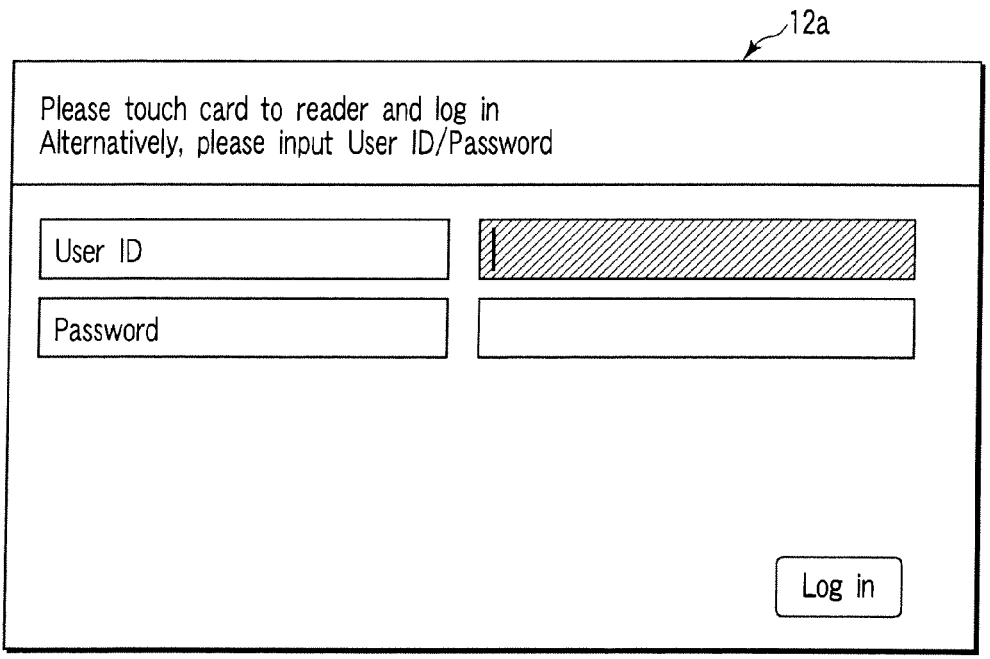
FIG. 6 is a view showing a display example of an authentication screen (log-in screen) of the user.

FIG. 6 is a view showing a display example of the user authentication screen (log-in screen). In the display example shown in FIG. 6, a guide for presentation of an IC card which the user has or guide for inputting of user ID as user authentication data and a password corresponding to the user ID is displayed. Further, in the display example of FIG. 6, an input column of user IDs and an input column of passwords are displayed.

The log-in screen may be used to display a guide only for presentation of the IC card or a guide only for inputting of user ID and password. Further, the log-in screen may be used to display a request for presentation of the IC card by the user and inputting of a password corresponding to the IC card.

The user information may be acquired from a magnetic card which the user has or RFID (Radio Frequency Identification) which the user has. Further, as the user information, a two-dimensional barcode, unidirectional barcode, living body information (for example, face authentication, fingerprint authentication, venous pattern of a palm, iris, voiceprint or the like) or the like can be used.

When the log-in screen shown in FIG. 6 is displayed, the user presents an IC card C to the reader/writer device 5 or inputs user ID and password by use of the operation panel 12. Further, when the user presents the IC card C to the reader/writer device 5, the main control portion 11 acquires user information (authentication data) read out from the IC card by use of the reader/writer device 5. Further, when the user inputs user ID and password by use of the operation panel 12, the main control portion 11 acquires the user ID and password input by use of the operation panel 12 as user information (authentication data).

When acquiring the user information, the main control portion 11 performs user authentication by collating the acquired user information with user information registered in the user information database 18 (step S12). If the user information database 18 is provided in the external device, the user authentication process is performed by collating the acquired authentication data with authentication data registered in the user information database 18 of the external device.

If the user authentication process is successfully performed, the main control portion 11 determines whether private print jobs corresponding to the user ID of the user who is successfully authenticated are present or not (step S13). If it is determined in the above determining step that the private print jobs of the user are not present ("NO" in the step S13), the main control portion 11 terminates the private print process. In this case, the main control portion 11 may display to the effect that the private print jobs of the user are not present on the display portion 12a.

Further, if it is determined in the above determining step that the private print jobs of the user are present ("YES" in the step S13), the main control portion 11 further determines whether a private print job which is now interrupted is present in the private print jobs of the user (step S14).

If it is determined in the above determining step that the private print job of the user which is now interrupted is not present ("NO" in the step S14), the main control portion 11 displays a selection screen of the private print jobs on the display portion 12a (step S15). On the selection screen of the private print jobs, the private print jobs of the user are displayed in a list form in a state in which they can be selected by use of the touch panel on the display portion 12a.

Figure 7:
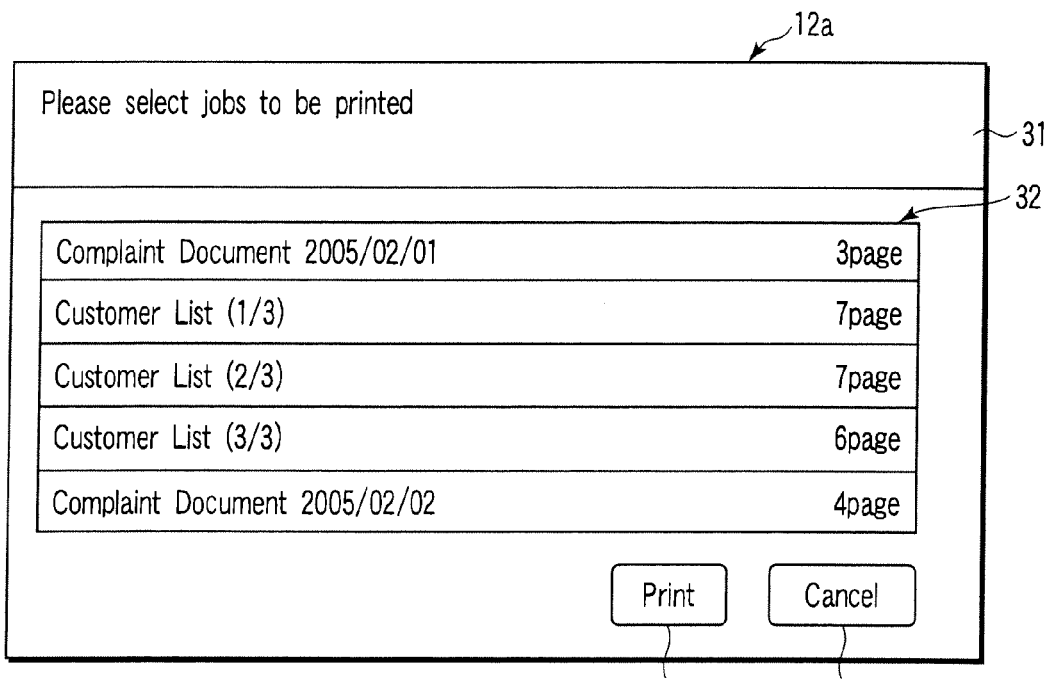
FIG. 7 is a view showing a display example of a selection screen of a private print job.

FIG. 7 is a view showing a display example of the selection screen of the private print jobs displayed on the display portion 12a. On the selection screen of the private print jobs shown in FIG. 7, an operation guide 31, print job list 32, print key 33, cancel key 34 and the like are displayed.

In the operation guide 31, a guide of "Please select jobs to be printed" is displayed. Further, in the print job list 32, private print jobs of the user are displayed in a state in which they can be selected by use of the touch panel. The print key 33 and cancel key 34 are displayed in a state in which they can be input by use of the touch panel. The print key 33 is a touch key used to instruct execution of the print process of the print job set in a selected state. The cancel key 34 is a touch key used to cancel execution of the private print process.

When the selection screen of the private print jobs is displayed on the display portion 12a, the user selects a print job to be printed from the print job list 32 (step S16). The print jobs displayed on the selection screen of the private print jobs are selected by touching the display column of a desired print job in the print job list 32 by the user. Further, on the selection screen of the private print jobs, a plurality of private print jobs can be simultaneously set in a selected state. That is, the user can select a plurality of private print jobs as one private print process.

Each time the private print job is selected by the user, the main control portion 11 estimates time (time required for printing) required for executing the selected private print job. Further, when the user selects a plurality of print jobs, the main control portion 11 estimates time (time required for printing) required for executing all of the selected private print jobs. Thus, time (time required for printing) required for executing the print job selected by the user is displayed on the display portion 12a (step S17).

Figure 8:
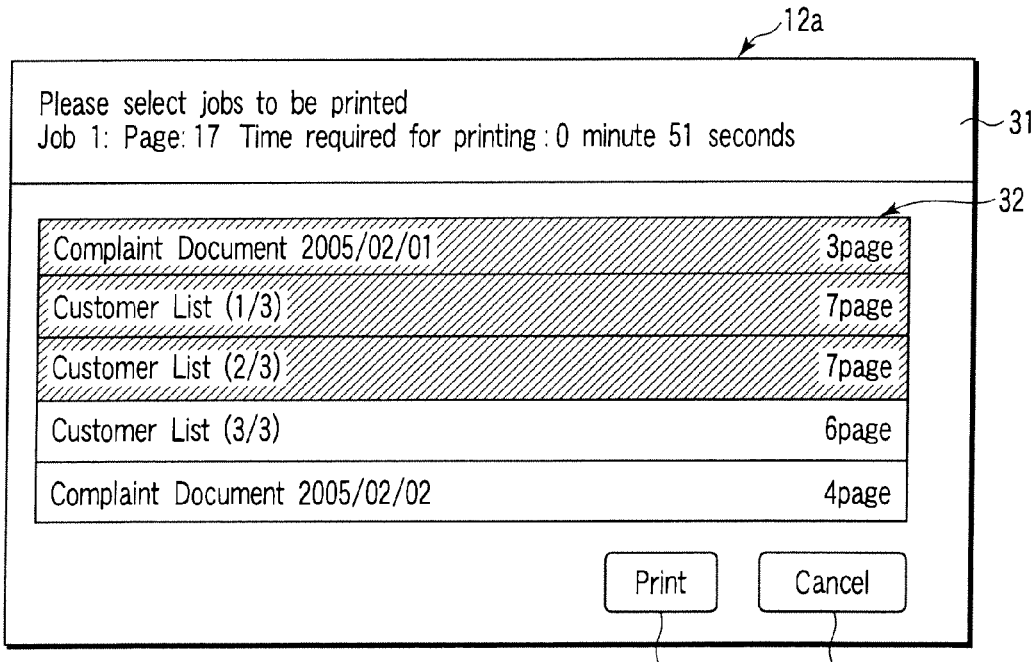
FIG. 8 is a view showing a display example of a selection screen of a private print job.

FIG. 8 is a view showing a display example of a state in which three print jobs are selected on the display screen shown in FIG. 7. In the display example shown in FIG. 8, the three print jobs selected by the user are highlighted (reverse-displayed). The reverse display indicates private print jobs in the selected state.

Further, in the display example shown in FIG. 8, the number of pages and time required for printing are displayed in addition to the display screen shown in FIG. 7. The number of pages indicates the total number of printing sheets of the print job selected. The time required for printing indicates time required for executing all of the print jobs selected. The time required for printing is estimated by the main control portion 11 based on the contents of the print jobs selected by the user.

In a state in which the selection screen of the private print jobs is displayed, it can be permitted for the user to specify the number of print copies of each print job (document) selected by the operation panel 12. In this case, on the selection screen of the private print jobs, the time required for printing and the total number of printing sheets set by taking the number of print copies into consideration are displayed on the display portion 12a.

According to the display example shown in FIG. 8, the user can easily confirm time required until the selected print job is completed. That is, the user can confirm time required for printing displayed on the display portion 12a and specify the start of the private print by use of the print key 33.

The user who has selected a desired print job on the selection screen of the private print jobs touches the print key 33 to specify the start of the print while confirming the time required for printing (step S18).

When the print key 33 is input, the main control portion 11 performs a private print process based on the selected private print job (steps S21 to S27).

When the private print process is started, the main control portion 11 performs an interruption detecting process to determine whether the private print process is interrupted or not until the print operation of the selected private print job is completed, that is, while the private print is being executed (step S21).

The interruption detecting process is a process to detect that the private print which is now executed is set into a state in which it is interrupted or not. For example, in the interruption detecting process, it is detected that the user has left a place near the image forming apparatus 1 or not.

The private print is based on the assumption that the user exists near the image forming apparatus in order to maintain the security. That is, when the user has left the place near the image forming apparatus, the security in the private print process cannot be maintained cannot be maintained.

Therefore, in the image forming apparatus 1 of the present embodiment, a process of detecting that the user has left a place near the image forming apparatus 1 is performed as the interruption detecting process. Further, as the interruption detecting process, it can be permitted to detect that the user requests interruption of the private print which is now executed or not.

As the realization form of the above interruption detecting process, the following processes (1) to (6) are provided.

(1) Input to a temporary interruption key by the user is detected:

In this case, the main control portion 11 permits the user to detect the presence of key input to temporarily interrupt the private print job which is now executed as the interruption process. The main control portion 11 determines that the private print which is now executed is interrupted based on the fact that the key is input by the user to temporarily interrupt the private print job.

(2) The presence or absence of an IC card C is detected:

In this case, the main control portion 11 monitors the presence or absence of an IC card C which can communicate with the reader/writer device 5 as the interruption detecting process. For example, the reader/writer device 5 transmits a response request to the IC card C at each preset interval and receives a response for the response request. The main control portion 11 determines that the private print which is now executed is interrupted based on the fact that it becomes impossible to detect the IC card C presented by the user.

(3) The presence of the user is detected based on the detection result of the sensor 7:

In this case, the main control portion 11 detects (monitors) whether or not the user exists near the image forming apparatus based on the result of detection of the sensor 7 as the interruption detecting process. The main control portion 11 determines that the user has left a place near the image forming apparatus (that is, the private print which is now executed is interrupted) based on the fact that it becomes impossible for the sensor 7 to detect the user.

(4) The presence of the user is detected based on an image photographed by the camera 6:

In this case, the main control portion 11 detects (monitors) whether or not the user exists near the image forming apparatus based on the image photographed by the camera 6 as the interruption detecting process. The main control portion 11 determines that the user has left a place near the image forming apparatus (that is, the private print which is now executed is interrupted) based on the fact that it becomes impossible to detect the user according to the image photographed by the camera 6.

(5) The presence or absence of RFID which the user has is detected:

In this case, a communication unit which communicates with the RFID is provided in the image forming apparatus 1. The main control portion 11 detects (monitors) whether or not the RFID of the user is set in a communicable state as the interruption detecting process based on the communication state between the communication unit and the RFID of the user. For example, the communication unit transmits a response request to the RFID at each preset interval and receives a response for the response request from the RFID. The main control portion 11 determines that the user has left a place near the image forming apparatus (that is, the private print which is now executed is interrupted) based on the fact that it becomes impossible to detect the RFID of the user.

(6) The user authentication process is performed at each preset time:

In this case, the main control portion 11 requests user authentication at each preset time for the user and detects that the user exists near the image forming apparatus 1 or not based on the authentication result of the user authentication as the interruption detecting process. The main control portion 11 determines that the private print which is now executed is interrupted based on the fact that the user authentication of the user fails.

If interruption of the private print which is now executed is not detected in the interruption detecting process ("NO" in the step S22), the main control portion 11 performs the print process of respective pages of each of the print jobs (documents) sequentially selected (step S23).

That is, each time the print process of one page is completed (step S23), the main control portion 11 determines whether or not all of the pages of the document (print data of a print job which is now printed) are already printed (step S24). When it is determined in the above determining step that all of the pages are not already printed ("NO" in the step S24), the main control portion 11 returns the process to the step S21 and performs the above process again.

Further, when it is determined in the above determining step that all of the pages of the document are already printed ("YES" in the step S24), the main control portion 11 determines whether or not the print process of the document for the number of copies specified by the user has been performed (step S25). If it is determined in the above determining step that the print process for all of the copies is not completed ("NO" in the step S25), the main control portion 11 returns the process to the step S21 and performs the above process again.

If it is determined in the above determining step that the print process for all of the copies is completed ("YES" in the step S25), the main control portion 11 deletes the private print job of the document from the job database 20 (step S26). When the print job of the document is deleted from the job database 20, the main control portion 11 determines whether or not the print process of all of the documents selected by the user is completed (step S27).

If it is determined in the above determining step that the print process of all of the documents selected by the user is not completed, that is, all of the private print jobs selected by the user are not completed ("NO" in the step S27), the main control portion 11 returns the process to the step S21 and performs the above process again.

If it is determined in the above determining step that the print process of all of the documents selected by the user is completed, that is, all of the private print jobs selected by the user are completed ("YES" in the step S27), the main control portion 11 returns the process to the step S21 and performs the above process again.

Next, the interruption process (steps S28 to S30) of interrupting the private print which is now executed is explained.

That is, when it is detected in the interruption detecting process of the step S21 that interruption of the private print process is detected ("YES" in the step S22), the main control portion 11 performs the interruption process of the private print job which is now executed (steps S28 to S30).

In the following explanation, it is assumed that interruption of the private print job which is now executed is detected as the interruption detecting process according to an instruction of the user as described in the process (1).

Figure 9:
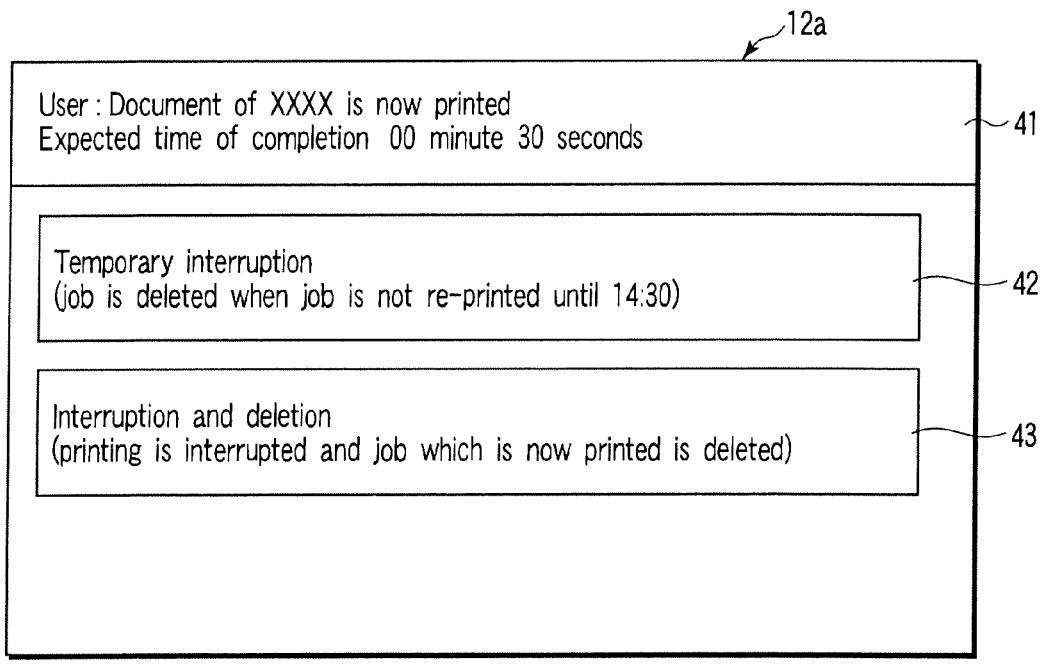
FIG. 9 is a view showing a display example displayed on a display portion while the private print job is being executed.

FIG. 9 is a view showing a display example displayed on the display portion 12a while the private print is being performed. In the display example shown in FIG. 9, a temporary stop key 42 and delete key 43 are displayed together with a print state guide 41.

In the print state guide 41, information indicating the user or a document which is now printed and expected time of the end of the private print which is now performed are displayed. The temporary stop key 42 and delete key 43 are touch keys which can be input by use of the touch panel.

The temporary stop key 42 is a touch key which is specified when the private print which is now performed is temporarily stopped. That is, when it is desired to temporarily interrupt the private print which is now executed and execute the interrupted private print later, the user touches the temporary stop key 42.

The delete key 43 is a touch key which is specified when the private print which is now executed is deleted. That is, when it is desired to interrupt the private print which is now executed and delete the private print which is being executed, the user touches the delete key 43.

When the display example shown in FIG. 9 is displayed on the display portion 12a while the private print is being executed, the process of detecting that the temporary stop key 42 or delete key 43 is selected is performed as the interruption detecting process. For example, when the user touches the temporary stop key 42, the main control portion 11 determines that the private print process which is now performed is interrupted. Further, when the user touches the delete key 43, the main control portion 11 determines that the private print which is now performed is deleted.

That is, when it is determined that the private print process which is now performed is temporarily interrupted ("temporary interruption" in the step S28), the main control portion 11 interrupts the private print process and stores print state information indicating the print state of the private print process until the interruption time in the job database 20 (step S29).

Further, when it is determined that the private print process which is now performed is deleted ("delete" in the step S28), the main control portion 11 interrupts the private print process and deletes all of the private print jobs associated with the private print process from the job database 20 (step S30).

Next, the re-starting process (steps S11 to S14 and steps S41 to S44) of re-starting the private print which is temporarily interrupted is explained.

That is, in the image forming apparatus 1, the private print which is temporarily interrupted by the interruption process is re-started by the operation of the user.

First, the user who has temporarily interrupted the private print performs user authentication in the image forming apparatus like the case of the steps S11 to S12. If the user authentication is successfully performed, the main control portion 11 of the image forming apparatus determines in the step S14 that the private print job of the user which is now interrupted exists in the job database 20 ("YES" in the step S14). When it is determined that the private print job which is now interrupted exists in the job database 20, the main control portion 11 displays a selection screen of the private print jobs of the user which are now interrupted on the display portion 12a (step S41).

On the selection screen of the private print jobs which are now interrupted, the private print jobs of the user which are now interrupted are displayed on the display portion 12a in a list form so as to be selected by use of the touch panel.

FIG. 10 is a view showing a display example of the selection screen of the private print jobs which are now interrupted and displayed on the display portion 12a. On the display screen shown in FIG. 10, an operation guide 51, print job list 52, successive printing key 53, other job selection key 54 and the like are displayed.

In the operation guide 51, a guide to the effect that a job whose printing process is interrupted is present is displayed.

In the print job list 52, the private print jobs of the user which are now interrupted are displayed so as to be selected by use of the touch panel. Each of the private print jobs displayed in the print job list 52 is selected by touching the display column of a corresponding print job by the user. In the print job list 52, all of the private print jobs that are now interrupted in the initial condition may be displayed so as to be selected. Thus, time and effort for the user who wants to re-start all of the private prints set in the interrupted state to select the respective private print jobs which are now interrupted can be saved.

The successive printing key 53 and other job selection key 54 are displayed in a state in which they can be input by use of the touch panel. The successive printing key 53 is a touch key to specify re-start of the print for a print job set in a selected state. When the successive printing key 53 is touched, the main control portion 11 performs (re-starts) the printing operation for the print job set in the selected state in the print job list 52.

The other job selection key 54 is a touch key to select a print job other than the private print jobs which are now interrupted. Further, when the other job selection key 54 is touched, for example, the main control portion 11 displays a selection screen of the private print jobs as shown in FIG. 7 on the display portion 12a.

When the selection screen of the private print jobs which are now interrupted is displayed on the display portion 12a, the user who re-starts the private print selects a print job to re-start the print process thereof from the print job list 52 (step S42). When the print job to be re-started is selected, the user touches the successive printing key 53 to specify re-start (start) of the selected print (step S43).

When the successive printing key 53 is input, the main control portion 11 restores the print state of the private print job at the interruption time based on print state information of the selected private print job in the job database 20 (step S44). When the print state of the private print job to be re-started is restored, the main control portion 11 re-starts the print process of the selected private print job and proceeds the process to the step S21.

As a result, the private print which has been interrupted is re-started according to the operation by the user. Further, the re-started private print is performed by the same process as that of the steps S21 to S27.

As described above, in the first embodiment, when the user requests interruption or it is detected that the user has left a place near the image forming apparatus, the private print which is now performed is interrupted and the print state at the interruption time is stored. Further, the interrupted job is re-started in response to a request from the user.

Thus, even when the user leaves the place near the image forming apparatus while the private print is being performed, the private print can be easily interrupted and re-started later.

Next, a second process example of the private print in the image forming apparatus 1 is explained.

In the second process example, a limit is put on the print amount (the number of print sheets, print time or the like) of one private print job which can be registered in the job database 20. This is because the print time of one private print job is limited to time which the user can wait without difficulty.

That is, in the second process example, it is made difficult for the user to leave a place near the image forming apparatus during the private print operation by completing one private print job within a preset period of time. As a result, a possibility that the user leaves the place near the image forming apparatus during the private print operation becomes lower and the security can be prevented from being lowered.

Further, in the second process example, when the user requests a private print job which requires a long print time, the private print job is divided into a plurality of private print jobs which are each completed within preset time and registered in the job database 20. Therefore, in the second process example, the process for the private print job can be made more efficient.

Figure 11:
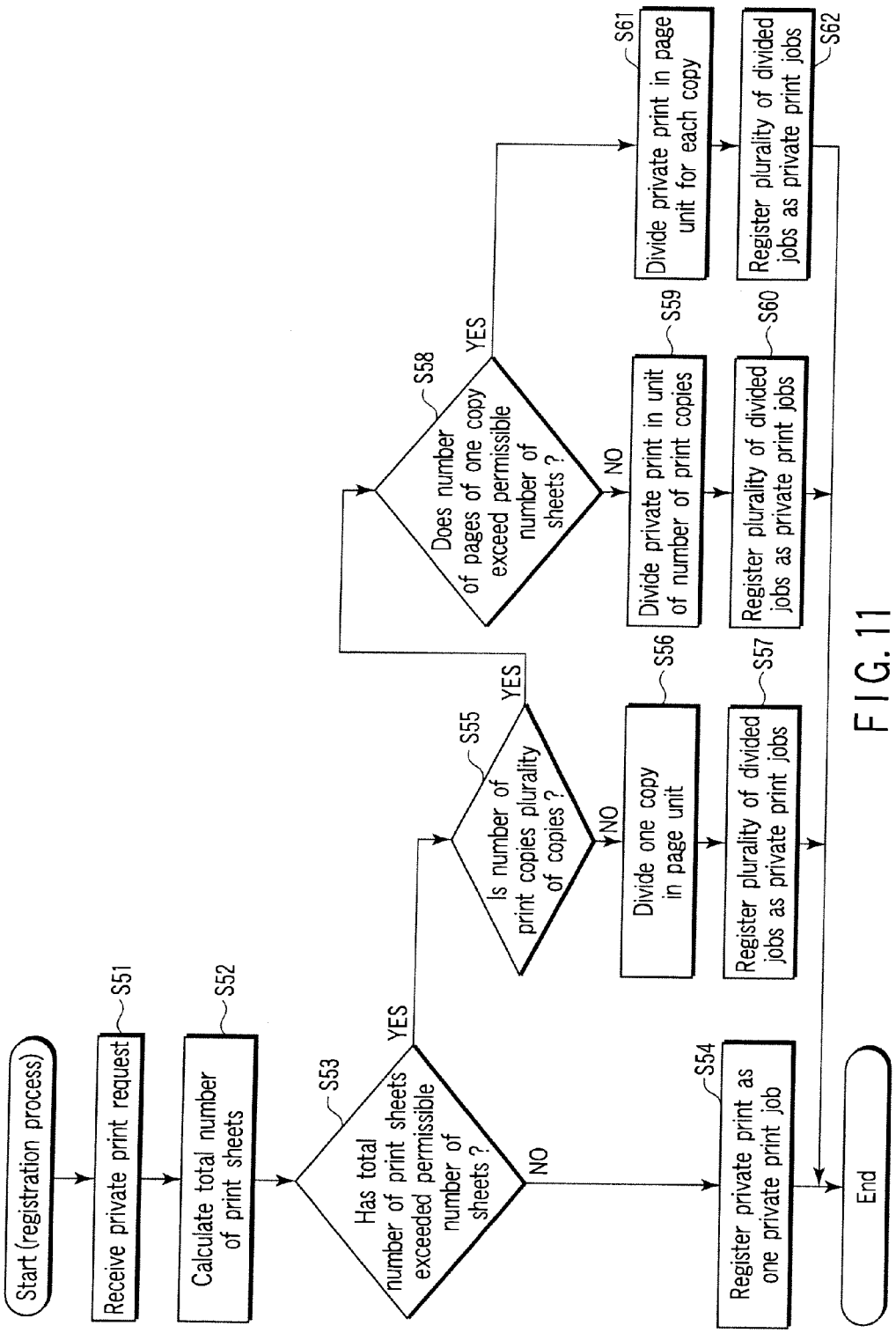
FIG. 11 is a flowchart for illustrating a second process example.

FIG. 11 is a flowchart for illustrating the second process example.

In the second process example explained below, it is assumed that the permissible number of sheets for the number of print sheets is previously set as a limit value of the print amount which can be registered in the job database 20 as one private print job. The permissible number of sheets as the limit value of the print amount may be previously stored in the setting storage portion 15a of the print control portion 15 or previously stored in an internal memory (not shown) of the main control portion 11.

First, it is assumed that the image forming apparatus 1 receives a private print request from the terminal device 3 via the network 4 (step S51). The private print request contains information indicating the user, information of print data (a document to be printed), the number of pages of print data (the number of pages of a document to be printed), the number of print copies (the number of copies of a document to be printed) and the like.

When receiving the private print request from the terminal device 3 (step S51), the main control portion 11 of the image forming apparatus 1 calculates the total number of print sheets of the received private print (step S52). For example, the main control portion 11 calculates the total number of print sheets by multiplying the number of pages of print data by the number of print copies.

When the total number of print sheets of the received private print is calculated, the main control portion 11 determines whether the total number of print sheets exceeds the permissible number of sheets or not (step S53). If it is determined in the above determination step that the total number of print sheets is smaller than the permissible number of sheets ("NO" in the step S53), the main control portion 11 registers the received private print as one private print job in the job database 20 (step S54).

Further, if it is determined in the above determination step that the total number of print sheets exceeds the permissible number of sheets ("YES" in the step S53), the main control portion 11 determines whether the number of print copies of the received private print is a plurality of copies or not (step S55).

When it is determined in the above determination step that the number of print copies of the received private print is one copy ("NO" in the step S55), the main control portion 11 divides the private print into a plurality of print jobs which are each smaller in number than the permissible number in the unit of the number of pages of print data of the private print (step S56).

When the private print is divided into a plurality of print jobs in the unit of the number of pages of the print data, the main control portion 11 registers the divided print jobs as private print jobs into the job database 20 (step S57).

Further, when it is determined in the above determination step that the number of print copies of the received private print is a plurality of copies ("YES" in the step S55), the main control portion 11 determines whether or not the number of pages of print data (document) of the received private print exceeds a permissible number of sheets (step S58).

If it is determined in the above determination step that the number of pages of print data (document) of the private print is less than the permissible number of sheets ("NO" in the step S58), the main control portion 11 divides the private print into a plurality of print jobs which are each smaller in number than the permissible number in the unit of the number of print copies of the private print (step S59).

When the private print is divided into a plurality of print jobs in the unit of the number of print copies, the main control portion 11 registers the divided print jobs as private print jobs into the job database 20 (step S60).

Further, if it is determined in the above determination step that the number of pages of print data of the received private print exceeds the permissible number of sheets ("YES" in the step S58), the main control portion 11 divides the private print for every number of print copies of the private print and further divides the private print of each copy into a plurality of print jobs which are each smaller in number than the permissible number of sheets in the unit of the number of pages of print data (document) (step S59).

That is, in this case, the private print has the number of print copies which is a plurality of copies and the number of pages of print data exceeds the permissible number of sheets. Therefore, the main control portion 11 divides the private print into a plurality of print jobs based on the number of pages for each copy.

When the private print is divided into a plurality of print jobs in the unit of the number of pages for each copy, the main control portion 11 registers the divided print jobs as private print jobs into the job database 20 (step S62).

As a concrete example of the second process example, a case wherein the following private print is requested to the image forming apparatus 1 in which the permissible number of sheets is set to 20 sheets is explained.

When the private print having the number of pages of print data (document) which is six pages and the number of print copies of print data (document) which is three copies is received, the total number of print sheets of the private print becomes 6 (pages).times.3 (copies)=18 sheets. That is, the total number of print sheets (18 sheets) of the private print is less than the permissible number of sheets (20 sheets).

In this case, the main control portion 11 registers the private print as one private print job into the job database 20 without dividing the private print.

When the private print having the number of pages of print data (document) which is 25 pages and the number of print copies of print data (document) which is one copy is received, the total number of print sheets of the private print becomes 25 (pages).times.1 (copy)=25 sheets. That is, in the private print, the number of print copies is not a plurality of copies and the total number of print sheets (25 sheets) exceeds the permissible number of sheets (20 sheets).

In this case, the main control portion 11 divides the private print into a first print job from the first page to $20^{th}$ page and a second print job from a $21^{st}$ page to $25^{th}$ page. When the private print is divided into the first and second print jobs, the main control portion 11 registers the first and second print jobs as private print jobs into the job database 20.

When the private print having the number of pages of print data (document) which is six pages and the number of print copies of print data (document) which is five copies is received, the total number of print sheets of the private print becomes 6 (pages)×5 (copies)=35 sheets. That is, in the private print, the total number of print sheets (30 sheets) exceeds the permissible number of sheets (20 sheets), the number of pages is less than the permissible number and the number of print copies is a plurality of copies.

In this case, the main control portion 11 divides the private print into a first print job having the number of print copies which is three copies (6×3=18≦20) and a second print job having the number of print copies which is two copies (6×2=12≦20). When the private print is divided into the first and second print jobs, the main control portion 11 registers the first and second print jobs as private print jobs into the job database 20.

When the private print having the number of pages of print data (document) which is 25 pages and the number of print copies of print data (document) which is two copies is received, the total number of print sheets of the private print becomes 25 (pages)×2 (copies)=50 sheets. That is, in the private print, the total number of print sheets (50 sheets) exceeds the permissible number of sheets (20 sheets), the number of pages exceeds the permissible number and the number of print copies is a plurality of copies.

In this case, the main control portion 11 divides the private print into a first print job (the print job from the first page to $20^{th}$ page of the first copy) from the first page to $20^{th}$ page, a second print job (the print job from a $20^{th}$ page to $25^{th}$ page of the first copy) from a $21^{st}$ page to $25^{th}$ page, a third print job (the print job from the first page to $20^{th}$ page of the second copy) from the first page to $20^{th}$ page, and a fourth print job (the print job from a $20^{th}$ page to $25^{th}$ page of the second copy) from a $21^{st}$ page to $25^{th}$ page.

When the private print is divided into the first to fourth print jobs, the main control portion 11 registers the first, second, third and fourth print jobs as private print jobs into the job database 20.

When a plurality of image forming apparatuses in which different permissible amounts are set are configured to commonly use the job database on the network 4, the private print dividing process described above may be performed when a user authenticated by one of the image forming apparatuses performs a private print.

As described above, in the second process example, when the total number of print sheets of the received private print exceeds the permissible number of sheets, the image forming apparatus divides the private print into a plurality of print jobs for each copy if the number of print copies is a plurality of copies. Further, it divides the private print into a plurality of print jobs which are each smaller in number than the permissible number in the unit of the number of pages if the number of print copies is one copy. Also, the image forming apparatus divides the private print for each copy and divides the private print into a plurality of print jobs in the unit of the number of pages if the number of print copies is a plurality of copies and the number of pages of one copy exceeds the permissible number of sheets.

Thus, the print job having the number of print sheets which exceeds the permissible number can be prevented from being registered as one private print job. That is, the private print job registered in the job database 20 can be limited to the permissible number of sheets or less. As a result, time required for execution of one private print job can be suppressed. Thus, a possibility that the user will leave the place near the image forming apparatus during execution of the private print job can be suppressed and the security of the private print job can be prevented from being lowered.

Next, a third process example of the private print in the image forming apparatus 1 is explained.

In the third process example, a limit is put on the print amount of one private print. An object of the third process example is to suppress print time required for one private print performed by the operation of the user to time which the user can wait without difficulty.

That is, in the third process example, it is made difficult for the user to leave a place near the image forming apparatus during the private print operation of the user by suppressing the print time required for one private print to preset time or less. As a result, a possibility that the user leaves the place near the image forming apparatus during the print operation becomes lower and the security can be prevented from being lowered. Further, in the third process example, the process for the private print can be made more efficient by suppressing the private print which requires a long print time.

Figure 12:
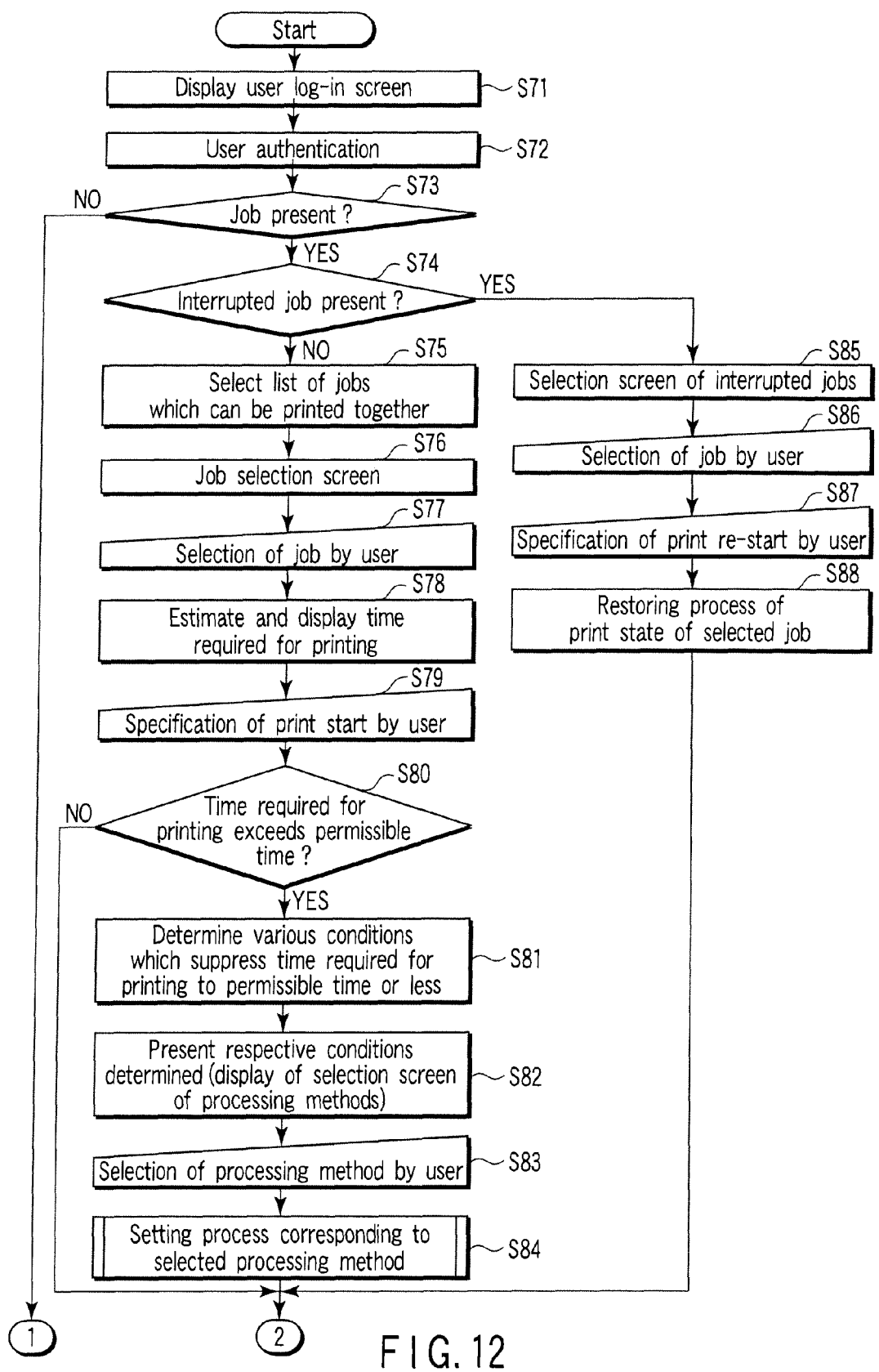
FIG. 12 is a flowchart for illustrating a third process example of the private print job of the image forming apparatus.

FIG. 12 is a flowchart for illustrating the third process example of the private print in the image forming apparatus 1.

The flowchart shown in FIG. 12 can be replaced by the flowchart shown in FIG. 4 explained as the first process example. That is, the private print as the third process example is a modification of the first process example and is performed by the processing procedure shown in FIGS. 12 and 5.

Further, in the following explanation, it is assumed that the permissible time for time required for printing is previously set as a limit value (permissible amount) of the print amount which can be attained as one private print. The permissible time as the limit value (permissible amount) of the print amount may be previously stored in the setting storage portion 15a of the print control portion 15 or previously stored in an internal memory (not shown) of the main control portion 11.

First, if the user who has moved to a place near the image forming apparatus 1 selects the private print function by use of the operation panel 12, the main control portion 11 of the image forming apparatus 1 displays the user authentication screen (log-in screen) on the display portion 12a of the operation panel 12 as in the step S11 (step S71). When user information is received from the user in a state in which the log-in screen is displayed on the display portion 12a, the main control portion 11 performs the user authentication by collating the acquired user information with user information registered in the user information database 18 as in the step S12 (step S72).

If the user authentication process is successfully performed, the main control portion 11 determines whether private print jobs corresponding to the user ID of the user who is successfully authenticated are present or not as in the step S13 (step S73). If it is determined in the above determining step that the private print jobs of the user are present ("YES" in the step S73), the main control portion 11 determines whether a private print job which is now interrupted is present in the private print jobs of the user as in the step S14 (step S74). If it is determined in the above determining step that the private print job of the user which is now interrupted is present ("YES" in the step S74), the main control portion 11 performs a re-start process of re-starting the private print job which is now interrupted as in the steps S41 to S44 (steps S85 to S88).

Further, if it is determined in the above determining step that the private print job of the user which is now interrupted is not present ("NO" in the step S74), the main control portion 11 performs a process of selecting a list of private print jobs which can be printed together within a predetermined permissible amount (permissible time) among the private print jobs of the user (step S75). In the selecting process, for example, the private print jobs which can be printed together within the predetermined time are selected in the order in which the reception date and time thereof are earlier (or in the order in which the job IDs thereof are smaller).

When the private print jobs which can be printed together within the predetermined time are selected, the main control portion 11 displays a selection screen of the private print jobs on the display portion 12a as in the step S15 and displays the private print jobs selected by the selecting process in the selected state (step S75). That is, in the step S75, the main control portion 11 displays a selection screen of the private print jobs on which the private print jobs which can be printed together within the permissible amount are set in the selected state.

Figure 13:
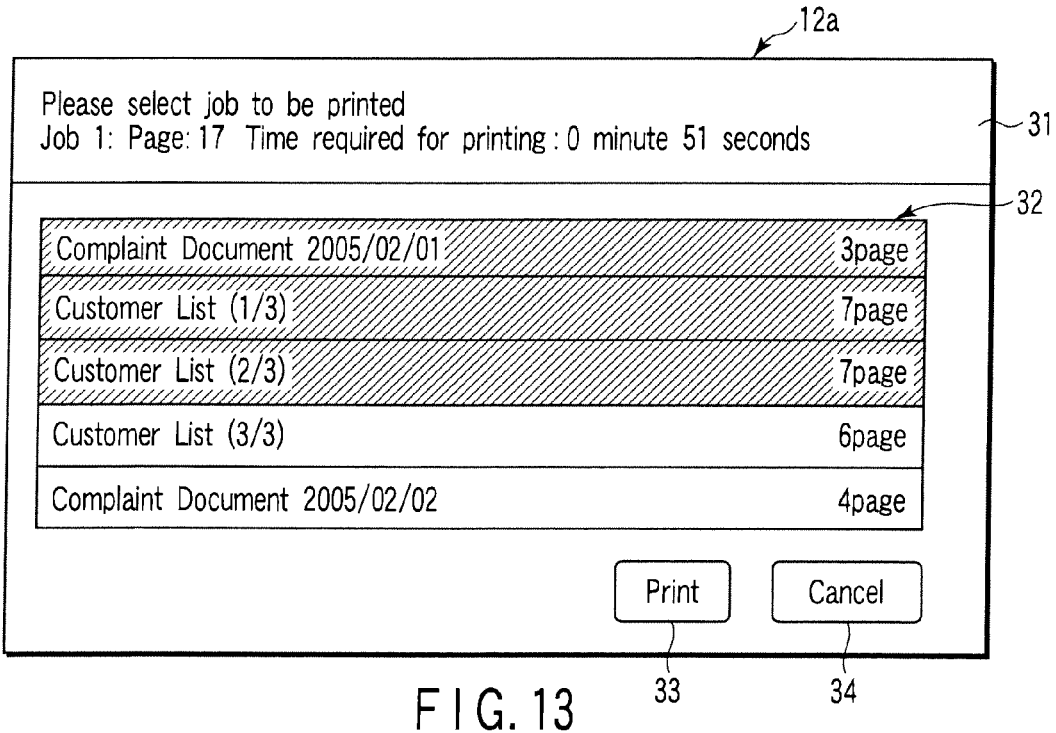
FIG. 13 is a view showing a display example of the selection screen of the private print job.

FIG. 13 is a view showing a display example of the selection screen of the private print jobs displayed in the step S75. Like the case of FIG. 7, in the display example of FIG. 13, an operation guide 31, print job list 32, print key 33, cancel key 34 and the like are displayed. Further, in the display example shown in FIG. 13, three selected print jobs are displayed (reverse-displayed) in the selected state. In the display example of FIG. 13, it is assumed that the permissible time as the permissible amount is one minute. Therefore, in the display example of FIG. 13, time (time required for printing) required for executing the three print jobs displayed in the selected state is displayed as time of 0 minute and 51 seconds which are set less than the permissible time (one minute).

When the selection screen of the private print jobs as shown in FIG. 13 is displayed on the display portion 12a, the user selects a private print job to be printed from the print job list 32 (step S77). Further, each time the private print job is selected by the user, the main control portion 11 estimates time (time required for printing) required for printing all of the private print jobs set in the selected state and displays the estimated time required for printing on the display portion 12a as in the step S17 (step S78).

If the print key 33 is touched on the selection screen of the private print jobs as shown in FIG. 13 (step S79), the main control portion 11 determines whether or not the time required for printing all of the selected private print jobs exceeds permissible time as the preset permissible amount (step S80).

If the time required for printing does not exceed the permissible time, that is, if the time required for printing is equal to or less than the permissible time ("YES" in the step S80), the main control portion 11 proceeds the process to the step S21 shown in FIG. 5 to perform the print process of the selected private print jobs.

Further, if the time required for printing exceeds the permissible time ("NO" in the step S80), the main control portion 11 performs a condition determining process to determine various conditions (print conditions) in order to set the time required for printing equal to or less than the permissible time (step S81). In the condition determining process, print conditions to set the time required for printing the selected private print jobs equal to or less than the permissible time are determined.

As the print conditions, the following conditions (1) to (3) are provided, for example.

(1) The private print job is changed to a private print job of another image forming apparatus.

This is determined according to whether or not a different image forming apparatus which can communicate with the present image forming apparatus 1 via the network 4 can perform the print operation for the private print job within the permissible time.

For example, if a different image forming apparatus (MFP2) having high-speed processing ability in comparison with the present image forming apparatus 1 is present, the main control portion 11 determines whether or not time required for printing is set equal to or less the permissible time when the private print job is executed by the MFP2 as the condition determining process.

If it is determined in the above determination step that the time required for printing is set equal to or less than the permissible time when the private print job is executed by the MFP2, the main control portion 11 determines that the private print job is changed to a private print job of the MFP2 as one condition.

In order to make the above determination, it is assumed that the present image forming apparatus has a function of acquiring information indicating the processing ability of a different image forming apparatus which can perform data communication with the present image forming apparatus. Further, information indicating the processing ability of the different image forming apparatus may be acquired from the different image forming apparatus as required or may be previously stored in a storage device such as an HDD of the present image forming apparatus.

(2) The print mode is changed.

This is determined according to whether or not time required for printing of the private print job is set equal to or less than the permissible time when the print mode of the private print job is changed.

For example, when the print mode of the private print job is a color print mode, the main control portion 11 determines whether or not the time required for printing of the private print job is set equal to or less than the permissible time if the print mode of the private print job is changed to a monochrome print mode as the condition determining process.

If it is determined in the above determination step that the time required for printing is set equal to or less than the permissible time when the print mode of the private print job is changed to a monochrome print mode, the main control portion 11 determines that the private print job is changed to a monochrome print mode as one of the conditions.

That is, the main control portion 11 determines whether or not the time required for printing can be reduced by changing the print mode (first print mode) of the private print job to a different print mode (second print mode) as the condition determining process. If it is determined in the above determination step that the time required for printing can be reduced by changing the first print mode to the second print mode, the main control portion 11 calculates time required for printing in the second print mode. After calculating the time required for printing in the second print mode, the main control portion 11 determines whether or not the calculated time required for printing is set equal to or less than the permissible time.

If it is determined in the above determination step that the calculated time required for printing is set equal to or less than the permissible time, the main control portion 11 determines the print mode of the private print job is changed to the second print mode as one of the conditions.

(3) The private print job is divided.

This is determined according to whether or not time required for printing one private print job among the selected private print jobs exceeds the permissible time.

That is, the main control portion 11 determines whether one private print job having time required for printing which exceeds the permissible time is selected or not as the condition determining process. If it is determined in the above determination step that one private print job having time required for printing which exceeds the permissible time is selected, the main control portion 11 determines that the private print job is divided into a plurality of print jobs as one of the conditions.

If various conditions which set the time required for printing of the private print job equal to or less than the permissible time are determined by performing the above condition determining processes, the main control portion 11 displays a selection screen of the private print processing method on the display portion 12*a* (step S82). On the selection screen, various selection keys to select the private print job processing methods and a warning to the effect that time required for printing exceeds the permissible time are displayed.

Figure 14:
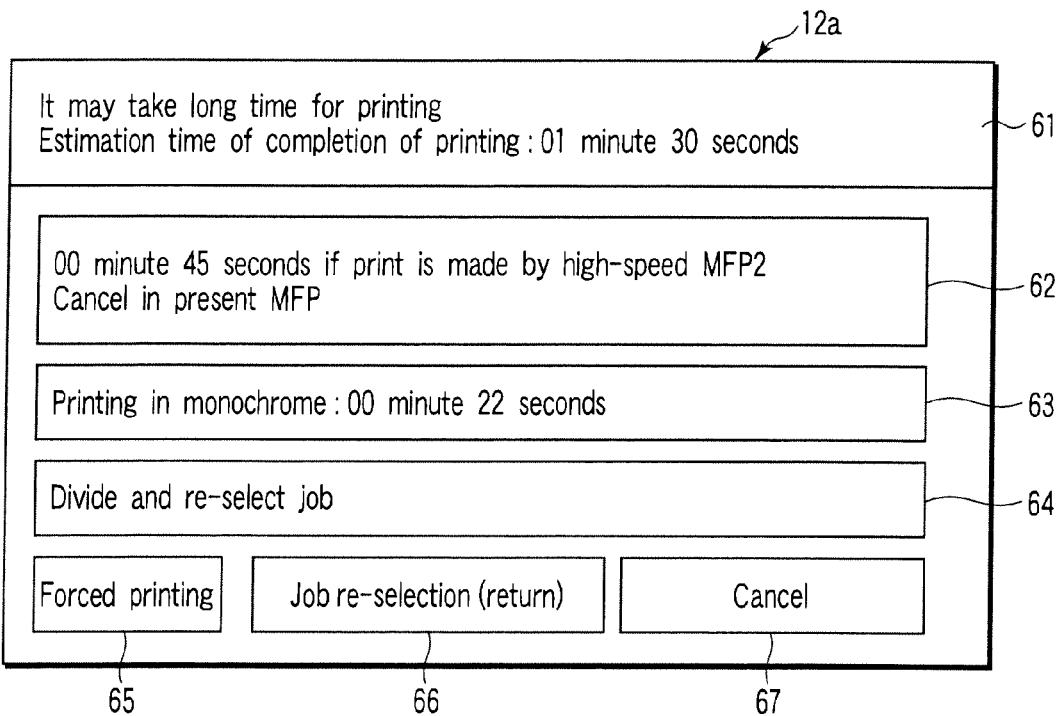
FIG. 14 is a view showing a display example of the selection screen of a processing method of the private print job.

FIG. 14 is a view showing a display example of the selection screen of the private print job processing methods.

In the display example shown in FIG. 14, a guide 61, first condition selection key 62, second condition selection key 63, third condition selection key 64, forced print key 65, job re-selection key 66, cancel key 67 and the like are displayed.

In the guide 61, a warning to the effect that a long time may be required to print the private print job which is now selected is displayed. Further, in the display example shown in FIG. 14, estimated time of completion of printing of the. private print job which is now selected is displayed together with the warning in the guide 61.

The first condition selection key 62, second condition selection key 63 and third condition selection key 64 are touch keys which can be selected by use of the touch panel. Further, the first condition selection key 62, second condition selection key 63 and third condition selection key 64 are keys to select one of processing methods corresponding to the condition determined by the condition determining process as the processing method for the private print job. Therefore, in the first condition selection key 62, second condition selection key 63 and third condition selection key 64, the contents of the respective processing methods are displayed.

The first condition selection key 62 is a touch key to change the print condition of the private print job to a first condition. In the display example shown in FIG. 14, it is selected that the private print job is changed so as to be executed by a different image forming apparatus by use of the first condition selection key 62. Further, in the display example shown in FIG. 14, in the first condition selection key 62, time required for printing when the different image forming apparatus performs the print operation and canceling of the private print job in the present image forming apparatus are displayed as the processing contents.

The second condition selection key 63 is a touch key to change the print condition of the private print job to a second condition. In the display example shown in FIG. 14, it is selected that the private print job is changed so as to be printed in a monochrome mode by use of the second condition selection key 63. Further, in the display example shown in FIG. 14, in the second condition selection key 63, time required for printing when the private print job is printed in the monochrome mode is displayed as the processing contents.

The third condition selection key 64 is a touch key to change the print condition of the private print job to a third condition. In the display example shown in FIG. 14, it is selected that the private print job is changed so as to be divided into a plurality of print jobs and re-selected by use of the third condition selection key 64. Further, in the display example shown in FIG. 14, in the third condition selection key 64, it is displayed to the effect that the private print job is divided into a plurality of print jobs and re-selected as the processing contents.

The forced print key 65, job re-selection key 66 and cancel key 67 are touch keys which are displayed on a selection screen of processing methods irrespective of the result of the condition determining process if time required for printing of the private print job exceeds the permissible time.

The forced print key 65 is a touch key which forcedly executes the private print job now selected. When the forced print key 65 is selected, the image forming apparatus 1 forcedly performs the print process of the private print job which is now selected.

The job re-selection key 66 is a touch key to re-select a private print job. When the job re-selection key 66 is selected, the image forming apparatus 1 returns the process to the step S75 and changes the display screen of the display portion 12*a* to a selection screen of the private print jobs.

The cancel key 67 is a touch key to cancel execution of the private print. When the cancel key 67 is selected, the image forming apparatus 1 terminates the private print process.

According to the selection screen of the processing methods, the user can instantly get information on various conditions to complete the private print within the preset permissible time immediately after specifying start of the selected private print job. Further, the user can select the processing method to complete the selected private print job within preset permissible time by one touch.

If the processing method is selected on the selection screen of the above processing methods, the main control portion 11 performs a setting process according to the selected processing method (step S84).

Figure 15:
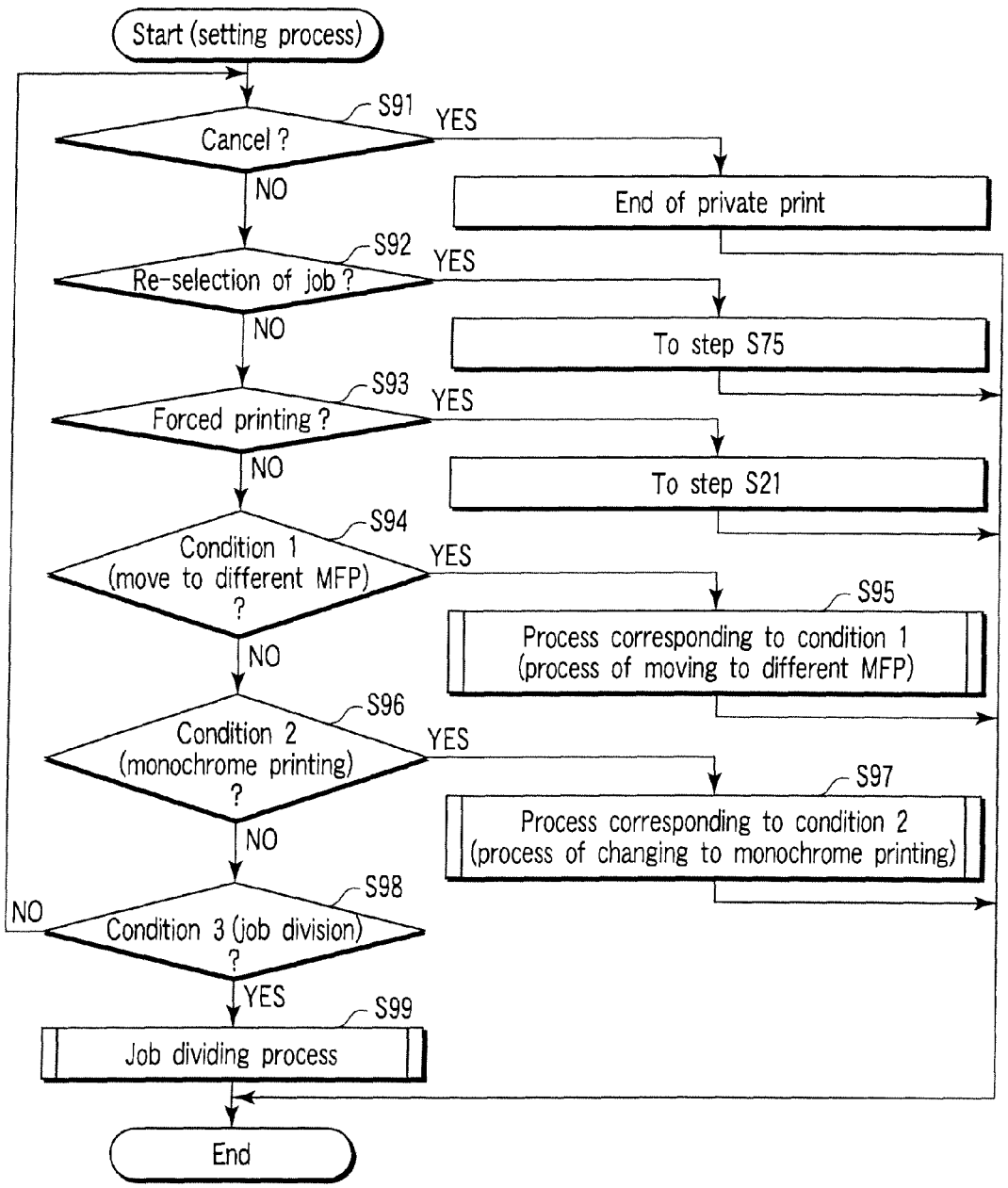
FIG. 15 is a flowchart for illustrating an example of a setting process corresponding to a selected processing method.

FIG. 15 is a flowchart for illustrating an example of the setting process corresponding to the selected processing method. In the flowchart shown in FIG. 15, an example of the setting process corresponding to the selection keys displayed on the selection screen of the processing methods shown in FIG. 14 is shown.

That is, when the cancel key 67 is selected ("YES" in the step S91), the main control portion 11 terminates the private print process. Further, when the job re-selection key 66 is selected ("YES" in the step S92), the main control portion 11 returns the process to the step S75. In this case, the display screen displayed on the display portion 12*a* is changed to a selection screen of the private print jobs. Further, when the forced print key 65 is selected ("YES" in the step S93), the main control portion 11 proceeds the process to the step S21 and forcedly performs the print process of the private print job which is now selected.

In addition, when the first condition selection key 62 is selected ("YES" in the step S94), the main control portion 11 performs the setting process to change the print condition of the private print job to the first condition (step S95).

For example, in the display example shown in FIG. 14, the first condition is a process of changing the private print job to a private print job of a different image forming apparatus. Therefore, when the first condition selection key 62 shown in FIG. 14 is selected, the main control portion 11 performs a process of moving the selected private print job to a different image forming apparatus as the setting process corresponding to the first condition.

That is, when the first condition selection key 62 is selected, the main control portion 11 first transfers the selected private print job to the different image forming apparatus. If the private print job thus transferred is registered in the job database 20 of the different image forming apparatus, the main control portion 11 deletes the selected private print job transferred to the different image forming apparatus from the job database 20 of the present image forming apparatus 1.

When the process of moving the selected private print job to the different image forming apparatus is performed, the main control portion 11 terminates the private print process.

Further, when the second condition selection key 63 is selected ("YES" in the step S96), the main control portion 11 performs a setting process to change the print condition of the private print job to the second condition (step S97).

For example, in the display example shown in FIG. 14, the second condition is a process of changing the print mode (first print mode) of the private print job to a monochrome print mode (second print mode). Therefore, when the second condition selection key 63 shown in FIG. 14 is selected, the main control portion 11 performs a process of changing the print mode of the selected private print job to a monochrome print mode (second print mode) as the setting process corresponding to the second condition.

Further, when the print mode of the selected private print job is changed to the monochrome print mode (second print mode), the main control portion 11 proceeds the process to the step S21 to execute the private print job in the monochrome print mode (second print mode).

Further, when the third condition selection key 64 is selected ("YES" in the step S98), the main control portion 11 performs a setting process to change the print condition of the private print job to the third condition (step S99).

For example, in the display example shown in FIG. 14, the third condition is a process of dividing the private print job into a plurality of print jobs. Therefore, when the third condition selection key 64 shown in FIG. 14 is selected, the main control portion 11 performs a process of dividing the selected private print job. In this case, a plurality of divided private print jobs are spooled in the job database 20. Further, one private print job which is used as a parent of division is deleted from the job database 20.

Therefore, when the process of dividing the private print job is performed, the main control portion 11 may instantly permit the user to re-select a private print job. In this case, after dividing the private print job, the main control portion 11 proceeds the process to the step S75 to display the selection screen so as to permit the user to select a private print job on the display portion 12*a*.

Further, when the process of dividing the private print job is performed, the main control portion 11 may instantly execute one of the divided private print jobs. In this case, when the main control portion 11 divides the private print job, it deals with one of the divided private print jobs as a to-be-printed object and proceeds the process to the step S21. Further, the print job among the divided print jobs which is not printed is printed by performing the process starting from the step S71 again.

As described above, in the third process example, when time required for one print process of performing the private print exceeds preset permissible time, the image forming apparatus displays a warning which indicates that time required for printing of the private print exceeds the permissible time.

Thus, the time required for one private print process can be suppressed within the preset permissible time. As a result, the possibility that the user will leave the place near the image forming apparatus while the private print job is being executed can be suppressed and the security of the private print job can be prevented from being lowered. Further, the efficiency of the private print can be enhanced by suppressing the private print which is required to take a long time for printing.

Further, in the third process example, when time required for the print process performed as one private print exceeds preset permissible time, the image forming apparatus determines various conditions to set the time required for the private print equal to or less than the permissible time and displays a processing method containing a process of changing the condition into one of the various conditions determined together with a warning.

Thus, a processing method of suppressing printing time required for performing one private print within preset permissible time and performing the private print within the permissible time can be provided for the user. As a result, the possibility that the user will leave the place near the image forming apparatus while the private print job is being executed can be suppressed and the security of the private print job can be prevented from being lowered. Further, the efficiency of the private print can be enhanced by suppressing the private print which is required to take a long time for printing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a user authenticating portion which authenticates users;
a print portion which prints a private print job held in a job memory portion which holds a private print request received as the private print job in response to an execution request from a user authenticated by the user authenticating portion;
a detecting portion which detects a nearby presence of the user of the private print lob; and
a control portion which interrupts print of the private print job by the print portion if the detecting portion does not detect the presence of the user nearby.

2. The image forming apparatus according to claim 1, wherein the detecting portion detects the presence of the user of the private print job nearby based on a detection result of a person detection sensor which detects a person nearby.

3. The image forming apparatus according to claim 1, wherein the detecting portion detects the presence of the user of the private print job nearby based on a communication state between a reader/writer device which communicates with a non-transitory computer-readable storage medium of the user of the private print job.

4. The image forming apparatus according to claim 1, wherein the detecting portion detects the presence of the user of the private print job nearby by detecting the user of the private print job from an image photographed by a camera which photographs an image of an area near the image forming apparatus.

5. The image forming apparatus according to claim 1, wherein the user authenticating portion performs a user authentication process, and wherein the detecting portion determines whether the authentication process by the user authenticating portion is successfully performed.

6. The image forming apparatus according to claim 4, wherein the image of the area includes a image of a nearby person.

7. The image forming apparatus according to claim 4, wherein the image of the area includes a image of a nearby person's face.

8. The image forming apparatus according to claim 1, further comprising an interface portion which receives the private print request from an external equipment.

9. The image forming apparatus according to claim 8, wherein the job memory portion is a job database which spools the private print request received by the interface portion as the private print job.

10. An image forming apparatus comprising:
a user authenticator which authenticates users;
a printer which prints a private print job held in a job memory which holds a private print request received as the private print job in response to an execution request from a user authenticated by the user authenticator;
a detector which detects a nearby presence of the user of the private print job; and
a controller which interrupts print of the private print job by the printer if the detector does not detect the presence of the user of the private print job near the image forming apparatus.

11. The image forming apparatus according to claim 10, wherein the detector detects the presence of the user of the private print job nearby based on a detection result of a person detection sensor which detects a person nearby.

12. The image forming apparatus according to claim 10, wherein the detector detects the presence of the user of the private print job nearby based on a communication state between a reader/writer device which communicates with a non-transitory computer-readable storage medium of the user of the private print job.

13. The image forming apparatus according to claim 10, wherein the detector detects the presence of the user of the private print job nearby by detecting the user of the private print job from an image photographed by a camera which photographs an image of an area near the image forming apparatus.

14. The image forming apparatus according to claim 10, wherein the user authenticator performs a user authentication process, and wherein the detector determines whether the authentication process by the user authenticator is successfully performed.

15. The image forming apparatus according to claim 13, wherein the image of the area includes a image of a nearby person.

16. The image forming apparatus according to claim 13, wherein the image of the area includes a image of a nearby person's face.

17. The image forming apparatus according to claim 10, further comprising an interface which receives the private print request from an external equipment.

18. The image forming apparatus according to claim 17, wherein the job memory is a job database which spools the private print request received by the interface as the private print job.

19. An image forming method, comprising:
authenticating users;
printing a private print request received as a private print job in response to an execution request from an authenticated user;
detecting a presence of the user of the private print job near an image forming apparatus; and
interrupting the private print job which is being printed if the user is not detected to be present near the image forming apparatus.

20. The image forming method according to claim 19, wherein a presence of the user near the image forming apparatus is detected from an image photographed by a camera which photographs an image of an area near the image forming apparatus.

* * * * *